US011442982B2

(12) United States Patent
Crisci et al.

(10) Patent No.: US 11,442,982 B2
(45) Date of Patent: Sep. 13, 2022

(54) METHOD AND SYSTEM FOR ACQUIRING DATA FILES OF BLOCKS OF LAND AND OF BUILDING PLANS AND FOR MAKING MATCHES THEREOF

(71) Applicant: Andrea-Luca Crisci, Stafford Heights (AU)

(72) Inventors: Andrea-Luca Crisci, Stafford Heights (AU); George Walker-Fitzgerald, Kangaroo Point (AU)

(73) Assignee: Andrea-Luca Crisci, Stafford Heights (AU)

( * ) Notice: Subject to any disclaimer, the term of this patent is extended or adjusted under 35 U.S.C. 154(b) by 454 days.

(21) Appl. No.: 16/254,597

(22) Filed: Jan. 23, 2019

(65) Prior Publication Data
US 2019/0228486 A1    Jul. 25, 2019

(51) Int. Cl.
*G06F 16/583* (2019.01)
*G06F 16/532* (2019.01)
*G06F 16/538* (2019.01)

(52) U.S. Cl.
CPC ........ *G06F 16/5846* (2019.01); *G06F 16/532* (2019.01); *G06F 16/538* (2019.01)

(58) Field of Classification Search
CPC .. G06F 16/5846; G06F 16/538; G06F 16/532; G06F 16/444; G06F 16/29
USPC ......................................................... 707/722
See application file for complete search history.

(56) References Cited

U.S. PATENT DOCUMENTS

| 6,584,603 | B1* | 6/2003 | Shibuya | G06F 30/39 |
| | | | | 716/123 |
| 10,460,168 | B1* | 10/2019 | Boyer | G06V 20/176 |
| 10,515,414 | B2* | 12/2019 | Pershing | G06Q 40/08 |
| 2002/0061132 | A1* | 5/2002 | Furukawa | G06V 20/13 |
| | | | | 348/E13.064 |
| 2003/0078897 | A1* | 4/2003 | Florance | G06Q 30/02 |
| | | | | 705/80 |
| 2004/0093576 | A1* | 5/2004 | Terasawa | G06F 30/392 |
| | | | | 716/129 |
| 2009/0138113 | A1* | 5/2009 | Hoguet | G06F 30/13 |
| | | | | 700/98 |

(Continued)

*Primary Examiner* — James Trujillo
*Assistant Examiner* — Fariborz Khoshnoodi
(74) *Attorney, Agent, or Firm* — Reches Patents

(57) ABSTRACT

A method for matching building floor plans with specifications for blocks of land wherein the building floor plans comprise image files; the method comprising:
  storing specifications for each of a plurality of blocks of land in a database the specifications including lengths of block sides;
  processing the image files of each of the building floor plans to thereby store specifications for each of said plans in the database the processing including:
    converting text in each plan into parseable text and identifying numerical values in the string to extract length and width values for external dimensions of the floor plan, and
    identifying one or more orientation critical words from the text string and its position on the plan; and
  querying the database to determine compatible matches between a selected one of the building floor plans and the blocks of land, or vice-versa, taking into account the specifications including the extracted length and width values and the orientation critical words.

16 Claims, 15 Drawing Sheets

(56) References Cited

U.S. PATENT DOCUMENTS

| | | | |
|---|---|---|---|
| 2009/0319180 A1* | 12/2009 | Robinson | H04W 4/029 |
| | | | 701/532 |
| 2011/0213593 A1* | 9/2011 | Wilson | G06F 30/13 |
| | | | 703/1 |
| 2012/0066215 A1* | 3/2012 | Gerstner | G06F 16/444 |
| | | | 707/723 |
| 2015/0286989 A1* | 10/2015 | Alvarado | G06F 16/51 |
| | | | 705/313 |
| 2018/0025452 A1* | 1/2018 | Fadeev | G06Q 50/165 |
| | | | 705/315 |
| 2019/0220759 A1* | 7/2019 | Tierney | G06N 5/046 |

* cited by examiner

METHOD AND SYSTEM FOR ACQUIRING DATA FILES OF BLOCKS OF LAND AND OF BUILDING PLANS AND FOR MAKING MATCHES THEREOF

TECHNICAL FIELD

The present invention concerns an automated system to assist people desiring to have a house built to match available blocks of land with compatible building floor plans.

RELATED APPLICATIONS

The present application claims priority from Australian patent application No. 2018900243, filed 25 Jan. 2018, the disclosure of which is incorporated herein in its entirety by reference.

BACKGROUND ART

Any references to methods, apparatus or documents of the prior art are not to be taken as constituting any evidence or admission that they formed, or form part of the common general knowledge.

For people that have purchased a block of land with the intention of building their own home thereon, finding floor plans that are compatible with the block of land is time consuming. Similarly, in some situations a person may have decided on a floor plan for a house and then be faced with finding a block of land that would be compatible with the floor plan.

From a technical perspective, many building plans are stored as printed plans on paper or as raster image files such as JPEGs, GIFS, TIFFs or PNGs. Such files typically do not have meta-data associated with them that allows for easy retrieval of the dimensions of the floor plan. Furthermore, the plans may include features such as a garage, which must be located on the block with access to road frontage, or windows that are specifically intended to be orientated in a particular direction, for example to be north facing. Consequently it is important that an automated method for matching floor plans with blocks of land is capable of making matches without recourse to pre-stored meta-data and is also capable of making matches taking into account relative orientation requirements between the floor plan and the block of land.

It is an object of the present invention to address the above described problem.

SUMMARY OF THE INVENTION

According to a first aspect of the present invention there is provided a method for matching building floor plans with specifications for blocks of land wherein the building floor plans comprise image files; the method comprising:
storing specifications for each of a plurality of blocks of land in an electronic database the specifications including lengths of block sides;
electronically processing the image files of each of the building floor plans to thereby store specifications for each of said plans in said database the processing including:
converting text in each plan into parseable text and identifying numerical values in the string to extract length and width values for external dimensions of the floor plan, and
identifying one or more orientation critical words from the text string and its position on the plan; and
querying the database to determine compatible matches between a selected one of the building floor plans and the blocks of land, or vice-versa, taking into account the specifications including the extracted length and width values and the orientation critical words.

In a preferred embodiment of the invention the method includes maintaining a server in data communication with the database, the method including serving at least one page for acquiring the specifications for blocks of land to at least one remote client device over a data network for capturing specifications for a block of land from a user operating said remote client device.

Preferably the method includes serving a page including a graphical user interface for the user to draw a plan of the block of land into the remote client device.

In a preferred embodiment of the present invention the server checks each specification for a block of land that it receives prior to storing said specification in the database.

The method preferably includes operating the server to request the uploading of image files for floor plans from users via the at least one remote devices.

In a preferred embodiment of the invention the method includes pre-processing the floor plan image files to remove extraneous material from the image files. For example, the method pre-processing may include removing drawing title blocks and/or rendered building images from the image files so that only the floor plans remain in the pre-processed image files.

Preferably the step of removing extraneous material includes applying a blob detection procedure to identify major portions of the image file such as the floor plan component, the rendered image component, the drawing title block and any other image portion present in the image file.

In a preferred embodiment of the invention the method includes removing blobs that do not include floor plan features. For example the essential floor plan features may include floor plan drawings for doors and/or windows.

The pre-processing may include applying a trained decision machine to detect the essential floor plan features. For example, the trained decision machine may comprise one of: an artificial neural network, a logistic regression machine, a Bayesian classifier or a support vector machine. Wherein the trained decision machine has been previously trained and validated with training floor plan images.

Preferably optical character recognition (CR) is applied to each pre-processed floor plan image to convert text images in each image into parseable characters wherein the position of the text images numbers in the floor plan are recorded in association with adjacent width and length lines of the floor plan.

Similarly, the position of orientation critical words in the floor plan are recorded and used to determine orientation requirements for the floor plan.

The step of querying the database to determine compatible matches between a selected one of the building floor plans and the blocks of land, or vice-versa preferably includes either:
searching the database for plans with smaller dimensions than a block of land under consideration; or
searching the database for blocks of land with a larger dimension than a floor plan under consideration; and
returning a list of results matching the item under consideration to the at least one remote device with a prompt for a user to select an item from the list of results.

In the preferred embodiment of the invention the method includes, upon the user making the selection of the item, rendering the selected item relative to the item under consideration for review by the user.

The method may including providing user controls for the user to move and rotate the item under consideration relative to the selected item so that that the user can ascertain a preferred position and orientation.

According to a another aspect of the present invention there is provided a method for matching building floor plans with specifications for blocks of land wherein the building floor plans comprise image files; the method comprising:

storing specifications for each of a plurality of blocks of land in an electronic database the specifications including lengths of block sides;

operating a processor in data communication with the electronic database to process the image files of each of the building floor plans to thereby store specifications for each of said plans in said database the processing by the processor including:

converting text in each of the image files of said floor plans into parseable text and identifying numerical values in the parseable text to extract length and width values for external dimensions of the floor plan, and identifying one or more orientation critical words from the text string and its position on the plan; and operating the processor to query the electronic database to determine compatible matches between a selected one of the building floor plans and the blocks of land, or vice-versa, taking into account the specifications including the extracted length and width values and the orientation critical words; and operating the processor to present one or more of the compatible matches on an electronic display responsive to the processor.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
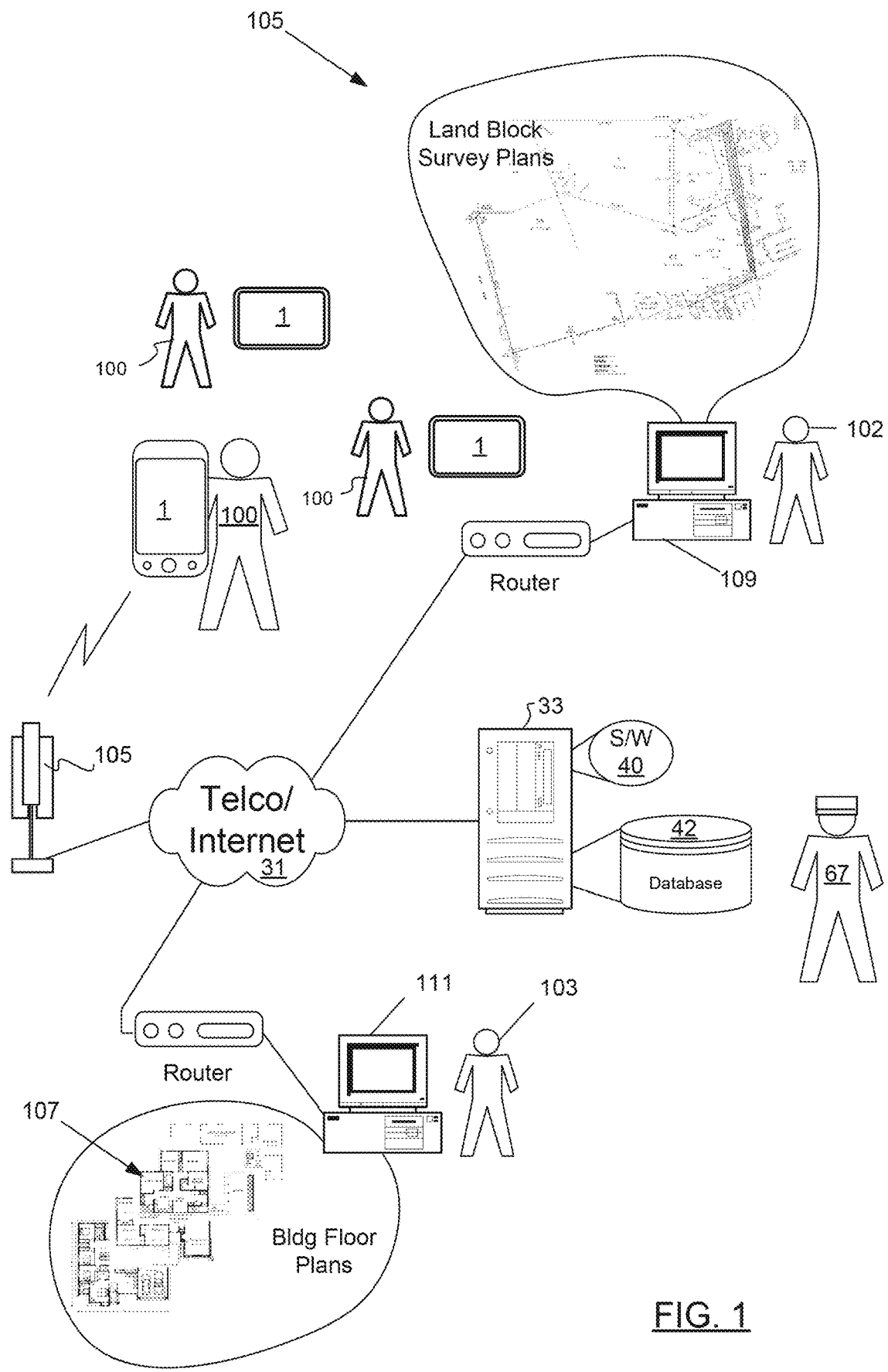
FIG. 1 is a block diagram of a system according to a preferred embodiment of the invention.

With reference to FIG. 1, a preferred system for matching blocks of land with building floor plans is illustrated. The system includes a server 33 that executes a specially programmed software product 40 and which is able to store and retrieve data from a database 42. The server 33 is administered by an Administrator 67 and is in data communication via the Internet and telecommunications networks 31 and 105 with a variety of remote devices. The remote devices include remote devices 1, such as smartphone and tablet devices that are operated by users in the form of subscribers 100 who will typically be people that are looking to build their own home on a block of land. Such subscribers may have a block of land under consideration and are looking for a building floor plan that will be compatible with (i.e. "match") the block of land. Alternatively they may have a floor plan for a home that they wish to build and thus they wish to find a block of land that will be compatible with the floor plan that they are considering using.

Apart from the devices 1 of the subscribers 100 the server 33 may also establish data communication with a device 109 of a person 102 that wishes to post plans for available blocks of land 105. For example, person 102 may be a sub-divider or a surveyor or a government agency that is releasing blocks of land for purchase by the public. Similarly, the server 33 may also establish data communication with a device 111 of a person 103 that wishes to post floor plans 107 for houses or other buildings. For example, person 103 may be a company that builds houses or an architectural firm or draftsman that prepares and sells house plans.

Figure 2:
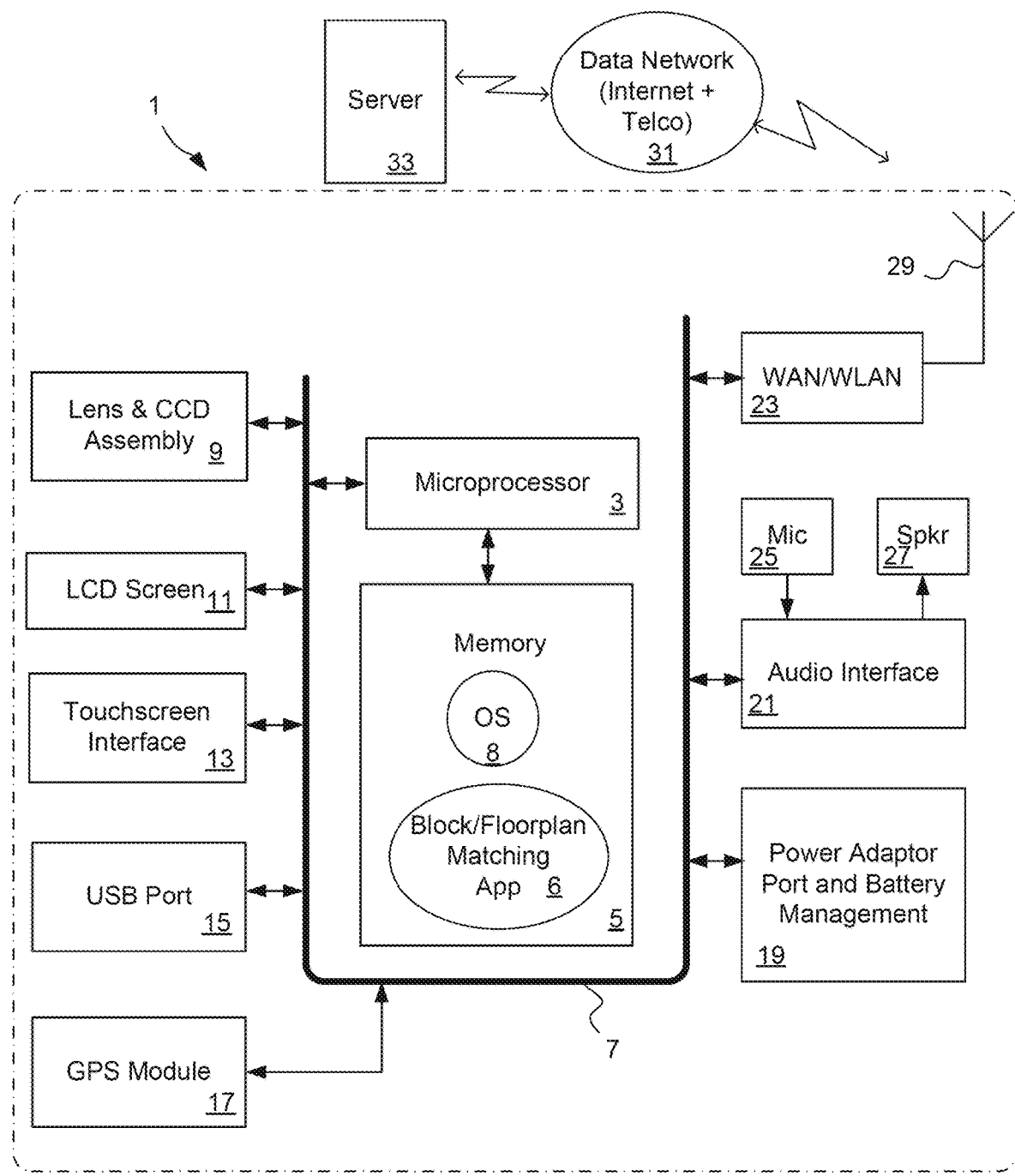
FIG. 2 is a block diagram of a portable computational device, of FIG. 1.

Referring now to FIG. 2 the remote devices 1 include a microprocessor 3 that accesses an electronic memory 5. The electronic memory 5 includes an operating system 8 such as the Android operating system or the Apple iOS operating system, for example, for execution by the microprocessor 3. The electronic memory 5 also includes Block/Floorplan Matching software product or "App" 6 according to a preferred embodiment of the present invention. The Block/Floorplan Matching App 6 includes instructions that are executable by the microprocessor 3 in order for the device 1 to assist in the implementation of a method that will be described. While it is preferred that the App 6 be a specialised custom built software product it could also be a general web-browser such as Firefox, Windows Explorer, Google Chrome or the like.

The microprocessor 3 is in data communication with a plurality of peripheral assemblies 9 to 23, as indicated in FIG. 2, via a data bus 7. Consequently, the device 1 is able to establish voice and data communication with a voice and/or data communications network 31 via WAN/WLAN assembly 23 and radio frequency antenna 29. As mentioned, in use the device 1 establishes data communication with the remote server 33 that is programmed with software product 40 to implement a Block/Floorplan matching method according to a preferred embodiment of the present invention.

Figure 3:
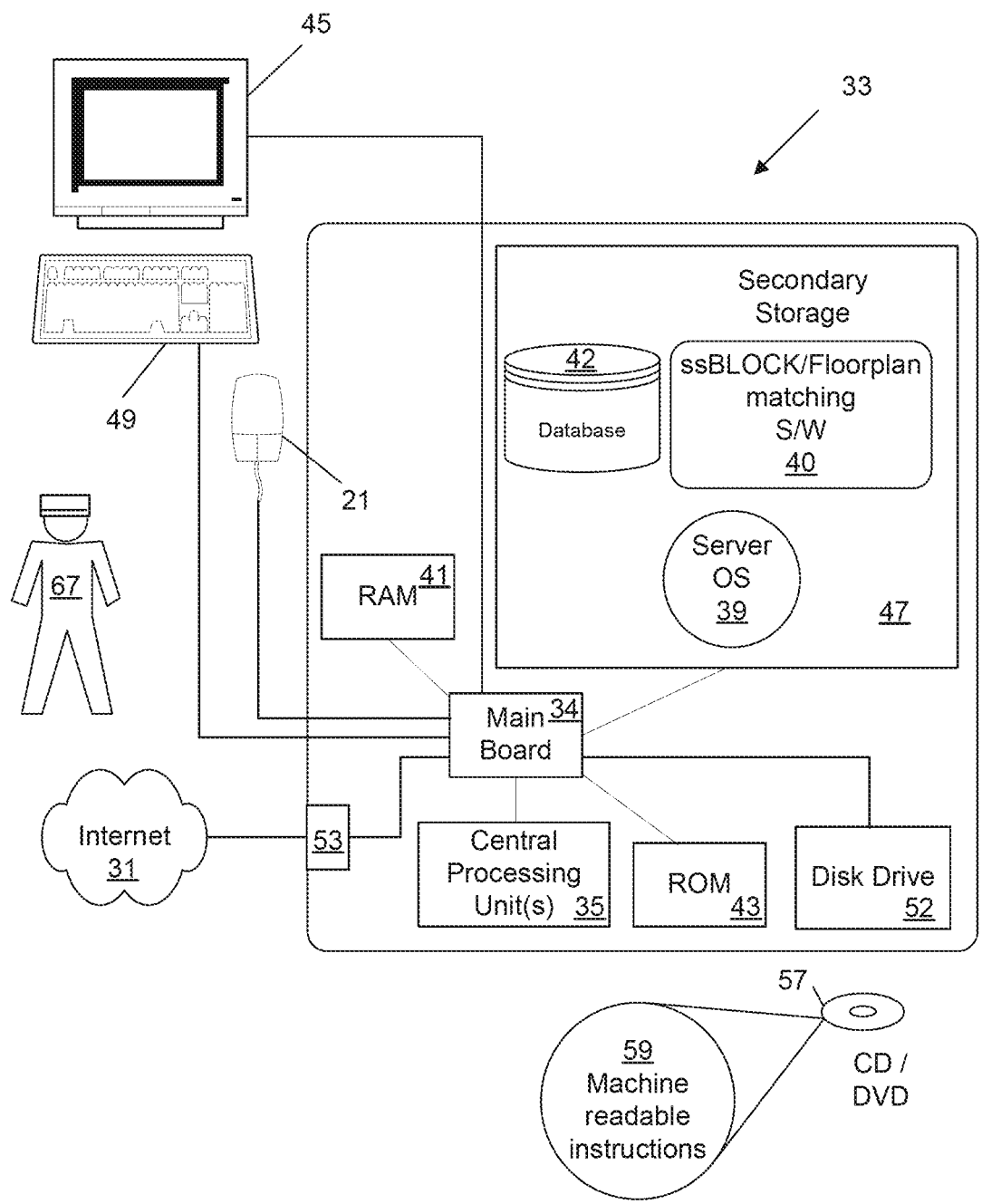
FIG. 3 is a block diagram of a server of FIG. 1.

FIG. 3 comprises a block diagram of the server 33. The server 33 includes secondary storage 47, which is typically implemented by a magnetic or solid state data drive and which stores a server operating system, for example Microsoft Windows Server, Linux Ubuntu Server are two examples of such an operating system. Server 33 can also be implemented "in the cloud" rather than as a discrete hardware unit as illustrated.

The secondary storage 47 also include a server-side Block/Floorplan matching software product 40 according to a preferred embodiment of the present invention which implements a database 42 that is also stored in the secondary storage 47. During operation of the server 33 the server processor assembly 35 loads the operating system 39 and then loads the software 40. The server processor electronically processes data such as image files as will be described.

In use the server 33 is operated by the administrator 67, either directly or by means of screen 45, keyboard 49 and mouse 21, or more commonly by remote terminal service from another computer across network 31. The Administrator 67 is able to monitor activity logs and perform various housekeeping functions from time to time in order to keep the server 33 operating in an optimal fashion. The remote devices 1 running App 6 in conjunction with server 33 executing the server-side Block/Floorplan matching software product 40 comprises a block and floorplan matching system according to a preferred embodiment of the present system. The term "Administrator" as used herein encompasses a technical, information technology, administrator and also other persons that are non-technical but associated with the server and assist in running the system, such as call centre and client liaison personnel.

Figure 4:
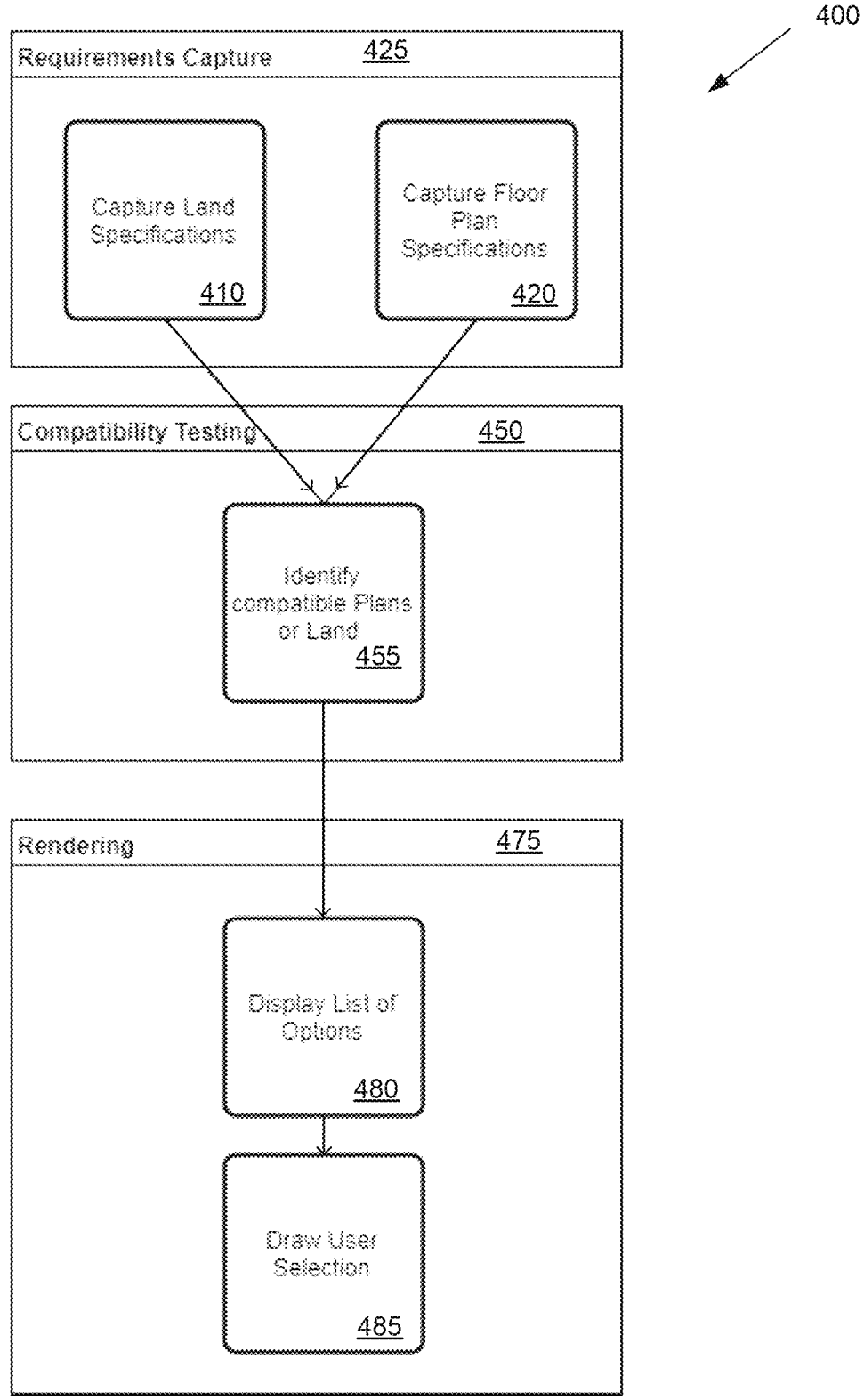
FIG. 4 is a high level flowchart of process steps performed by the server 33 under control of server side software 40.

Referring now to FIG. 4, the server side software product 40 implements a method that is illustrated in flowchart 400. The method involves three major stages being Requirements Capture 425, Compatibility Testing 450 and Rendering 475. The requirements capture stage 425 involves capturing specifications for each block of land (box 410) and capturing building floor plan specifications (box 420). Server 33 stores the specifications for each block of land and each floor plan in database 42. During the compatibility testing stage 450 the server queries database 42 to identify (box 455) compatible plans or blocks of land for a particular block of land or a particular floor plan. In the rendering stage 475 the server 33 displays a list of compatible options (box 480) being items such as building plans that are compatible with a block of land under consideration or blocks of land that are compatible with a building plan under consideration. The user then selects one of the compatible items and in response the server generates a graphical display (box 485) showing the compatible item juxtaposed with the item under consideration, e.g. a compatible block of land under a floor plan under consideration or a compatible floor plan overlaid on a block of land under consideration.

Figure 5:
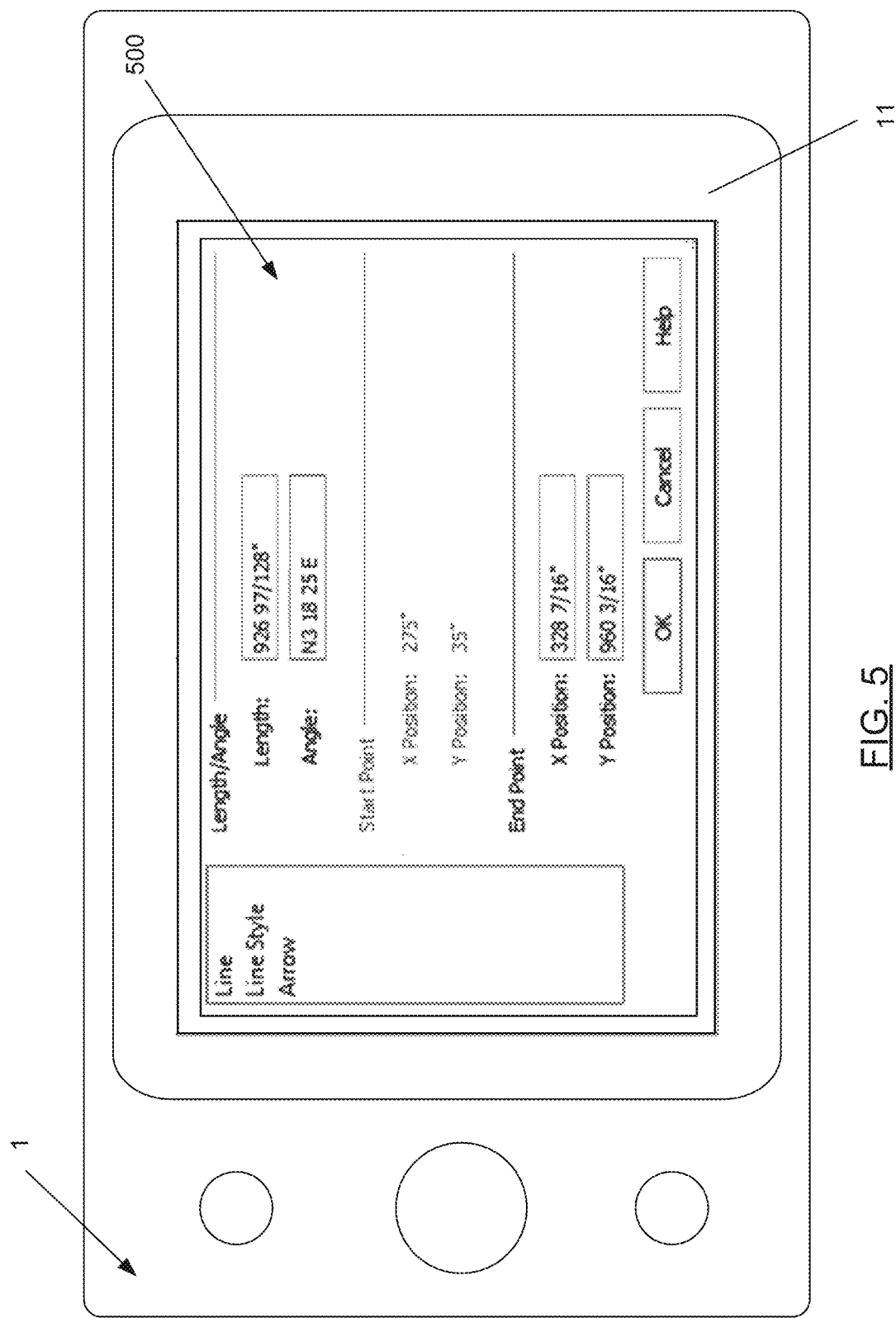
FIG. 5 is a view of the portable computational device displaying a screen for user input of specifications for a block of land.
Figure 6:
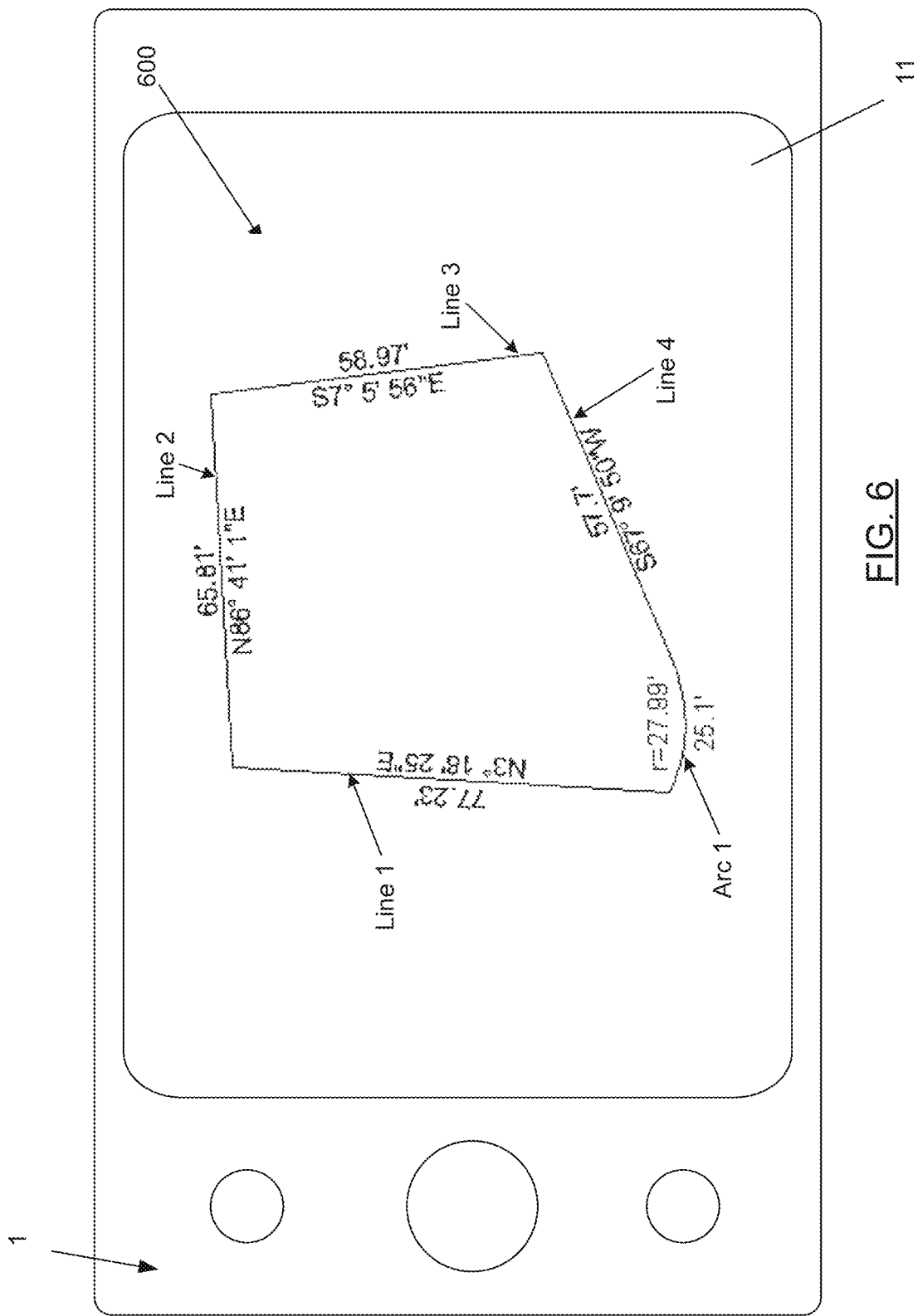
FIG. 6 is view of the portable computational device displaying a plan according of the input specifications for the block of land.

In box 410 the specifications for a block of land are captured by the server generating an online form 500 that is served across the network and which can be viewed on a user device 1. FIG. 5 shows the online form 500 displayed by App 6 on LCD screen 9 of device 1. Online form 500 provides for user data entry of the block's width, length and setbacks. A graphical interface can be generated either by App 6 running on device 1 or by the server side software product 40 running on server 33 and displayed in a web-browser running on device 1. The user can use drawing tools provided in the the graphical interface to draw the block of land under consideration. FIG. 6 shows a screen 600 thus produced showing a block of land with specifications in the form of dimensions on each line and additional specifications such as setbacks displayed.

Once the user has entered all the required specifications for the particular block of land the App 6 then transmits them across the data network to the server 33, for example using a HTTP Post request to be received by server 33. Server 33 receives the block of land specifications and performs a validity check to ensure that that the specifications meet basic requirements for a valid block of land. These basic requirements, which are implemented in software 40, include such things as the block being of more than a minimum surface area and less than a maximum surface area.

Figure 7:
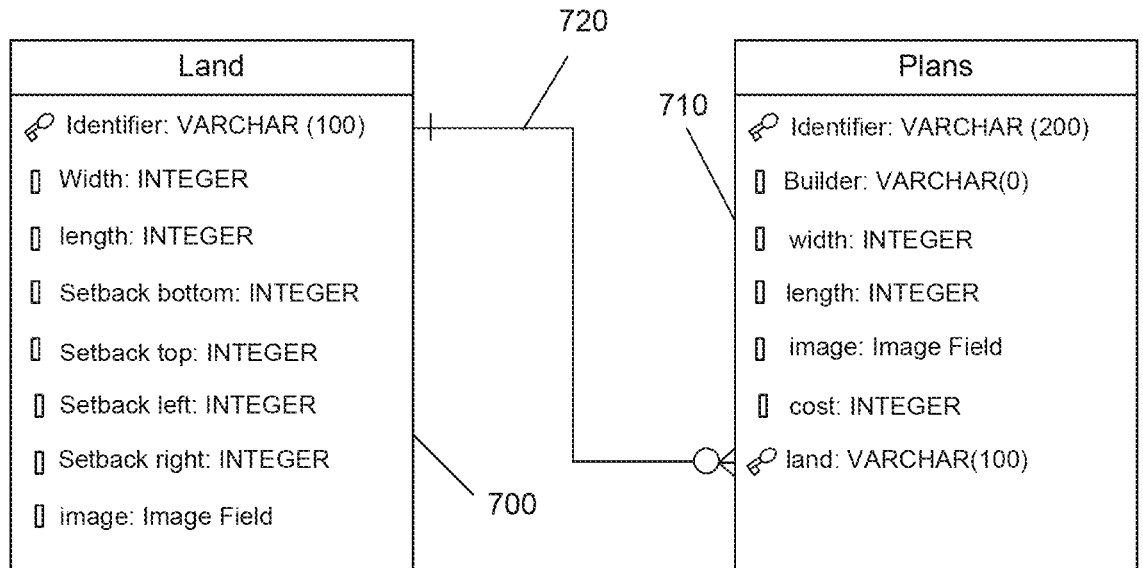
FIG. 7 is an exemplary table stored in a database of FIG. 1.

Assuming that the block of land specifications pass the validity check server 33 then stores the specifications with a unique identifier for the block of land in a table of the database 42. There will be at least one table for storing the specifications for the blocks of land in association with an identifier for each block as shown with reference to table 700 of FIG. 7 each row represents one block of uniquely identified land. Each row of the table 700 includes specification data such as width, length, setback bottom, top, left, right and an image, such as a JPEG file that will have a similar appearance to the block depicted in screen 600 of FIG. 6. As shown by the one-to-many relationship 720 in FIG. 7, each block of land may be related to more than one compatible floor plan stored in table 710.

Figure 8:
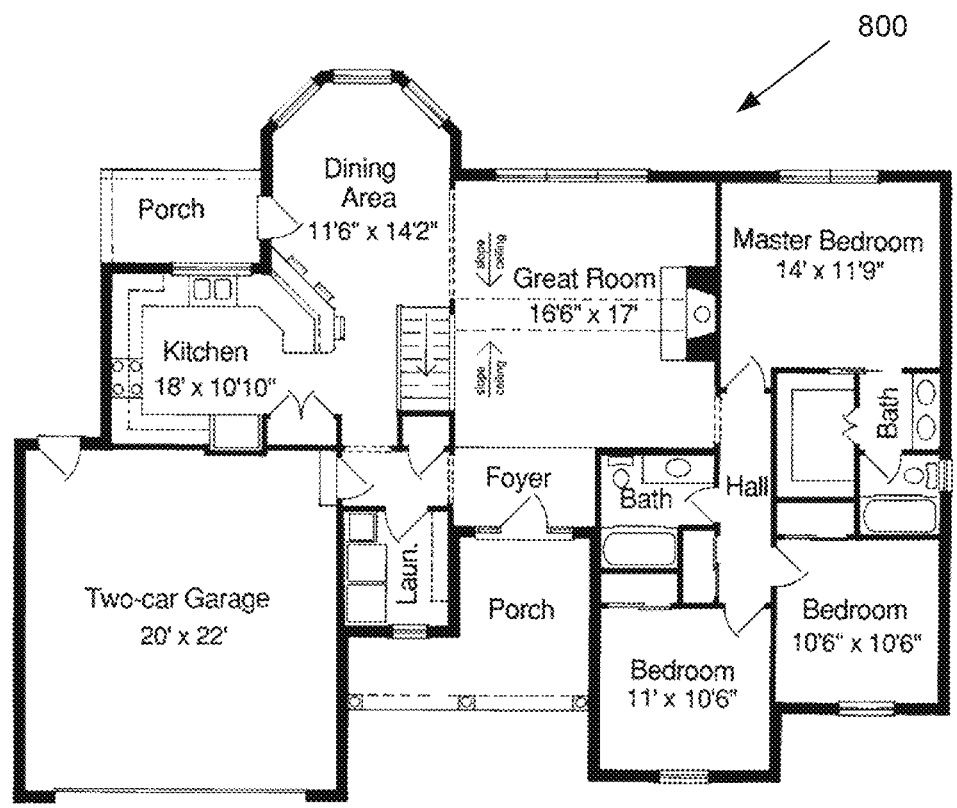
FIG. 8 is a view of an exemplary building floor plan for processing by the server of FIG. 1.
Figure 9:
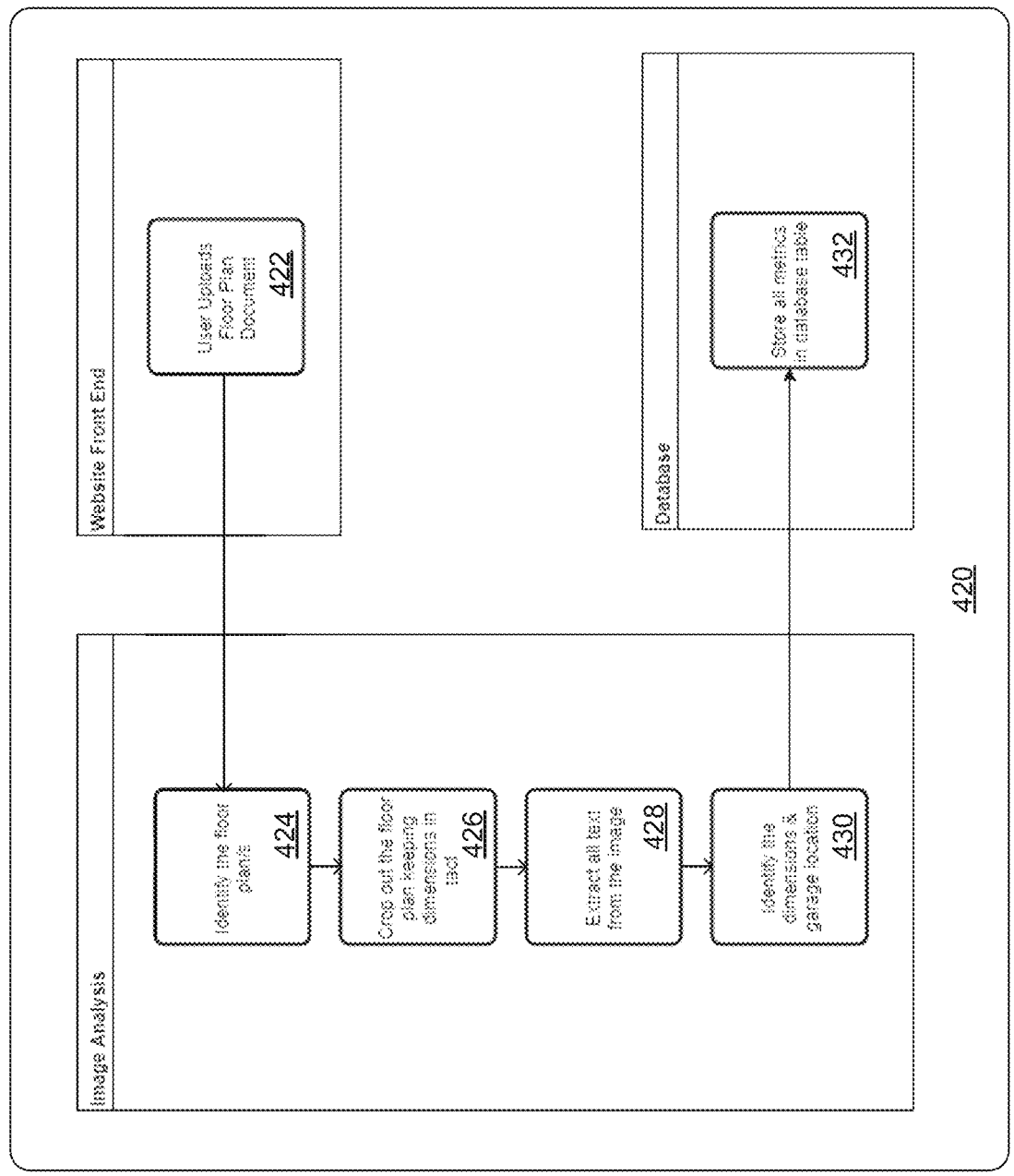
FIG. 9 is a flowchart of steps performed by the server in accordance with the server side software.
Figure 10:
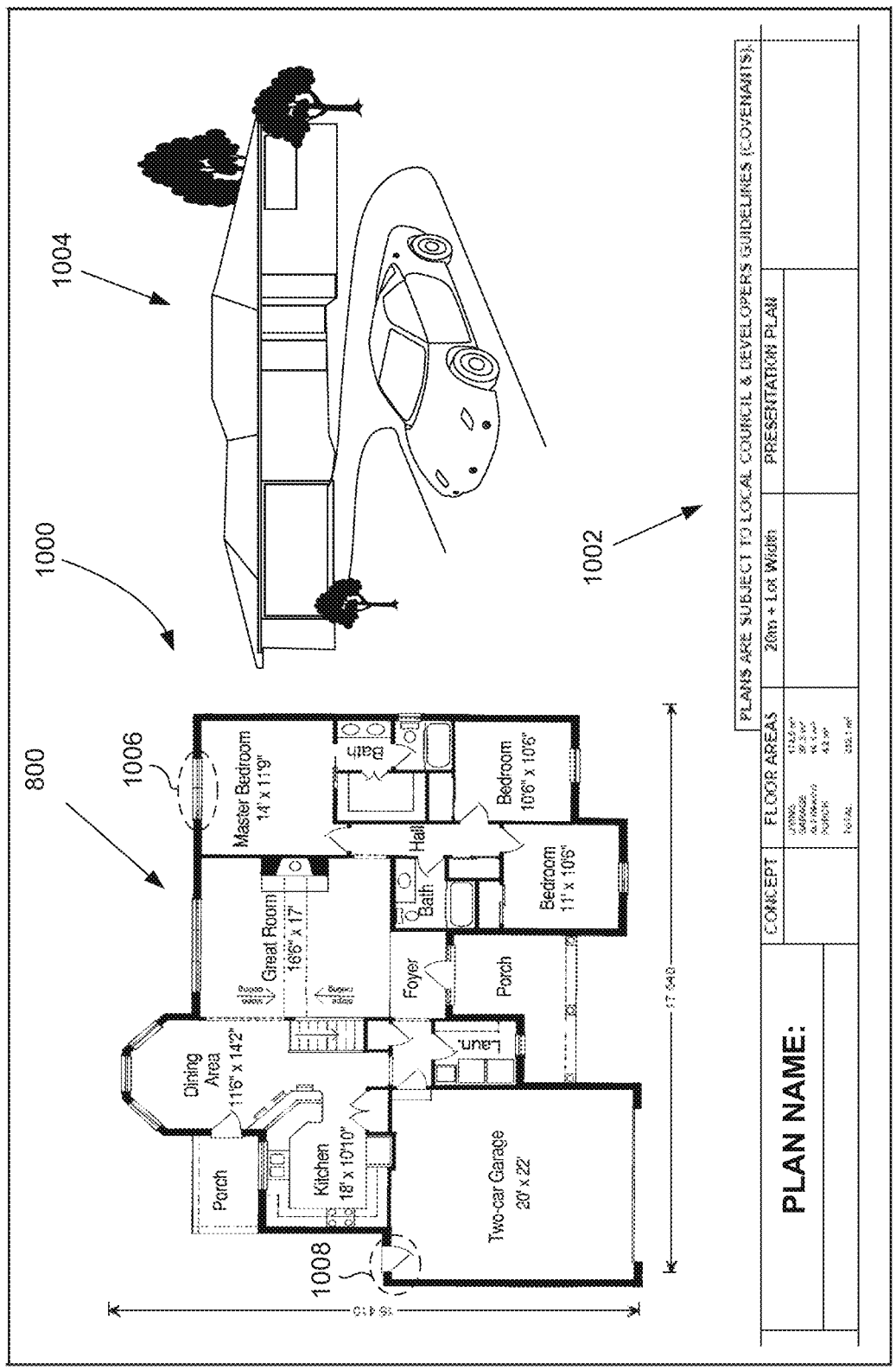
FIG. 10 is a view of a typical image of a house plan containing the building floor plan of FIG. 8.

In box 420 of the flowchart 400 of FIG. 4, the server 33 executes instructions of software product 40 to implement the capture of floor plan specifications. An exemplary floor plan is illustrated as item 800 of FIG. 8. The floor plan will typically be available as a raster image such as a JPEG file so that it does not contain vectors or embedded ASCII text but only pixel data. Consequently preferred embodiments of the present invention are capable of handling floor plans in such a format. FIG. 9 is a detail of the processes that occur within box 420 of the flowchart 400 of FIG. 4. Initially, at box 422 server 33 generates a form for presentation on device 1 for a user 100 to upload an image containing a floor plan such as building floor plan image 1000 of FIG. 10. It will be observed that the floor plan 1000 contains the actual building floor plan 800 that was previously illustrated in FIG. 8 but also other extraneous components such as an artist's impression 1004 of the finished house and a title block 1002. Therefore some pre-processing is needed to remove the extraneous material before specification data can be extracted from the floor building plan 800.

Referring again to FIG. 9, at box 424 the server performs image processing algorithms that comprise instructions coded in the software product 40 to perform blob detection to identify the three major components floor plan 800, artists impression 1004 and title block 1002 of plan 1000. This is preferably done using the openCV image processing suite (available from https://opencv.org/). The openCV library includes instructions for the server 33 to detect all contour objects (i.e. portions of the image having an outline). From the detected set of image objects unique features of the floor plan component 800 can be used to distinguish the floor plan component 800 from the other two components 1002 and 1004. Typical unique features of the floor plan component are features such as symbols for windows (e.g. item 1006) and doors (e.g. item 1008).

The pre-processing that server 33 performs to remove the extraneous material from the floor plan image may include applying a trained decision machine to detect the essential floor plan features. For example, the trained decision machine may comprise one of: an artificial neural network, a logistic regression machine, a Bayesian classifier or a support vector machine. The trained decision machine has been previously trained and validated using many training floor plan images.

One implementation of the blob detection algorithm finds the largest enclosed shape in an image and crops the image to that shape. The cropped shape can then be removed from the initial image and the process repeated to find the next largest blob. Finally the detected major blobs are processed to find one that contains the floor plan identifying features, e.g. doors and windows 1006, 1008.

Figure 11:
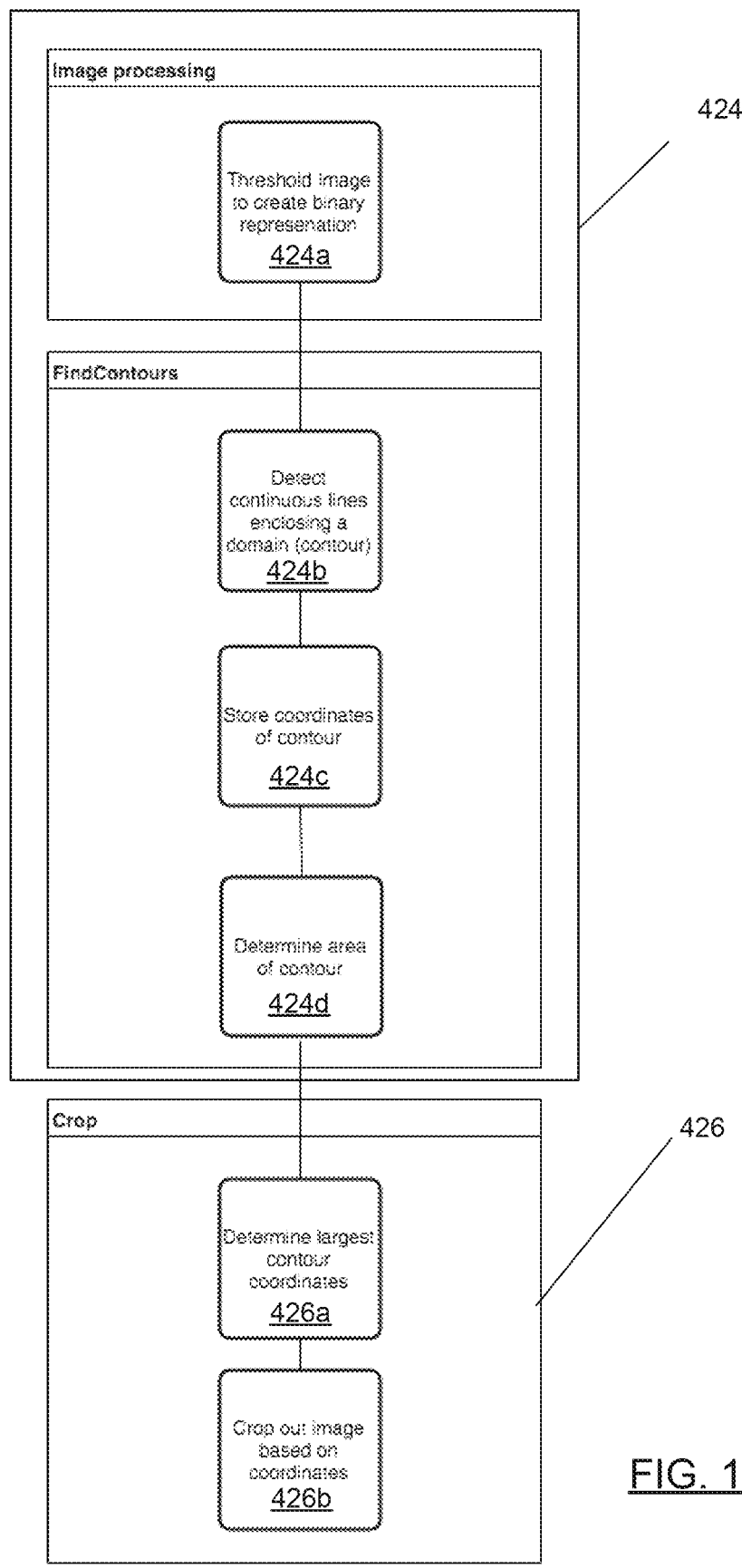
FIG. 11-13 are flowcharts of further steps performed by the server 33 in accordance with the server side software.

The process of blob detection that is carried out at boxes 424 and 426 of FIG. 9 is expanded upon in FIG. 11. At box 424a the image that is received is thresholded so that every pixel is either completely white, i.e. Hex FFFFFF or completely black, i.e. HEX 000000. At box 424b continuous line contour detection is implemented to find the largest blob. The coordinates of the contour are then stored at box 424c and at box 424d the area of the contour is determined. Finally at boxes 426a and 426b the largest contour coordinates are determined and the blob corresponding to those contours is cropped out. The procedures carried out in boxes 426a to 426b may be carried out by the following blob detection code for example:

Blob Detection Code Example:

```
# Create image object from file
image_name = "media/" + image_name
# Convert image to openCV format (Red green blue bitmaps)
Irgb = cv2.imread(image_name)
#Split image into red green and blue
components  R,G,B = cv2.split(Irgb)
# Threshold image to create binary image
ret, Ithres = cv2.threshold(Rfilter,
0,255,cv2.THRESH_BINARY_INV+cv2.
THRESH_OTSU)
# Find the largest contour and extract it
im, contours, hierarchy =
cv2.findContours(Ithres,
cv2.RETR_EXTERNAL,cv2.CHAIN_APPROX_NONE )
  maxContour = 0
  for contour in contours:
    contourSize =
cv2.contourArea(contour)
  if contourSize > maxContour:
      maxContour = contourSize
      maxContourData = contour
  original_image = cv2.imread(image_name)
  # Get the rect coordinates of the contour
  lm, tm, rm, bm = rect_for_contour(maxContourData)
  # Crop the image
  crop_img=original_image[tm:bm, lm:rm]
  cv2.imwrite(image_name, crop_img)
```

Figure 12:
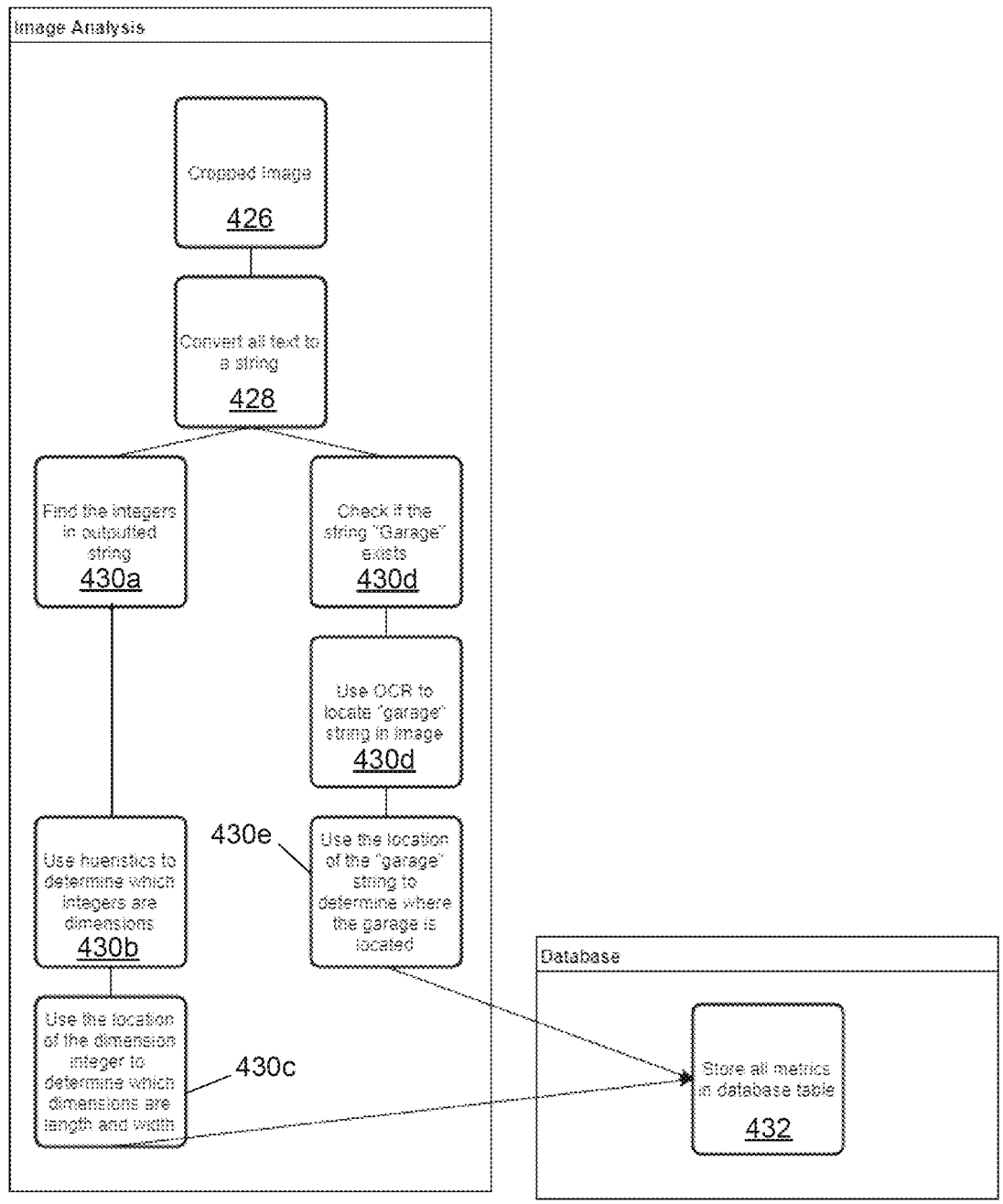

With reference to the flowchart of FIG. 12, once the floor plan with dimensions is isolated (box 426) the dimensions of the house of the house plan are extracted. Dimension extraction involves converting all text in the image with Optical Character Recognition (OCR) to one or more text strings (box 428) and extracting number values, e.g. integers (box 430a) to retrieve the length and width dimensions of the floor plan. The extracted numbers are then associated with the sides of the house to which they correlate, i.e. dimension lines closest to the numbers in the floor plan blob (boxes 430b, 430c).

Orientation critical information, such as the presence and location of a garage in the plan is searched for (box 430d) in the character string generated by the OCR step at box 428. Box 430d involves parsing one or more character strings that are output by the OCR step to find the string "garage" and/or other orientation critical strings. The location of the orientation critical information in the image in the floor plan blob is also recorded (box 430e). Finally at box 432 the server 33 stores all of the extracted floor plan specification data (i.e. metrics) in the server 42.

Figure 13:
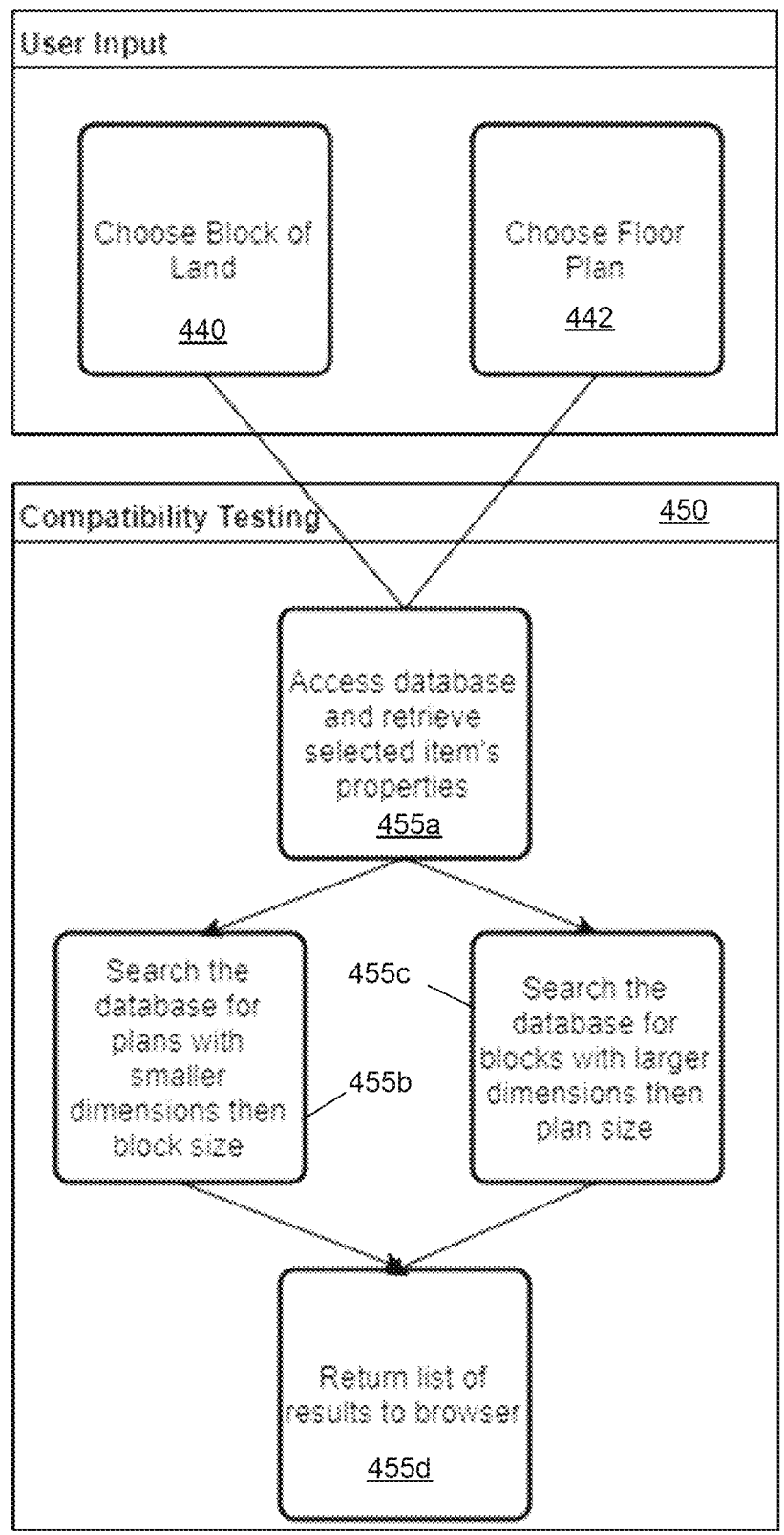

Referring now to the flowchart of FIG. 13, a subscriber 100 (FIG. 1) may operate their device 1 to select a block of land (box 440) for which they wish to find a compatible floor plan, or alternatively select a floor plan (box 442) for which they wish to find a compatible block of land.

Compatibility testing (box 450) is the process of determining the compatible floor plans for a given block of land and vice versa. All metrics for land and floor plans are stored in database tables in database 42 such that server 33 can access the database and retrieve the selected item's properties, i.e. its specifications (box 455a) and determine the compatibility of floor plans with blocks by querying the database 42. The query result (box 455b or box 455c depending on whether the process started with box 440 or box 442) contains a list of plans that are small enough to fit on a block of land given setbacks and building requirements. The resultant query is parsed to the browser to display options to the user 100 (box 455d) by means of their device 1 running either a web browser or a dedicated App 6 (FIG. 2).

Figure 14:
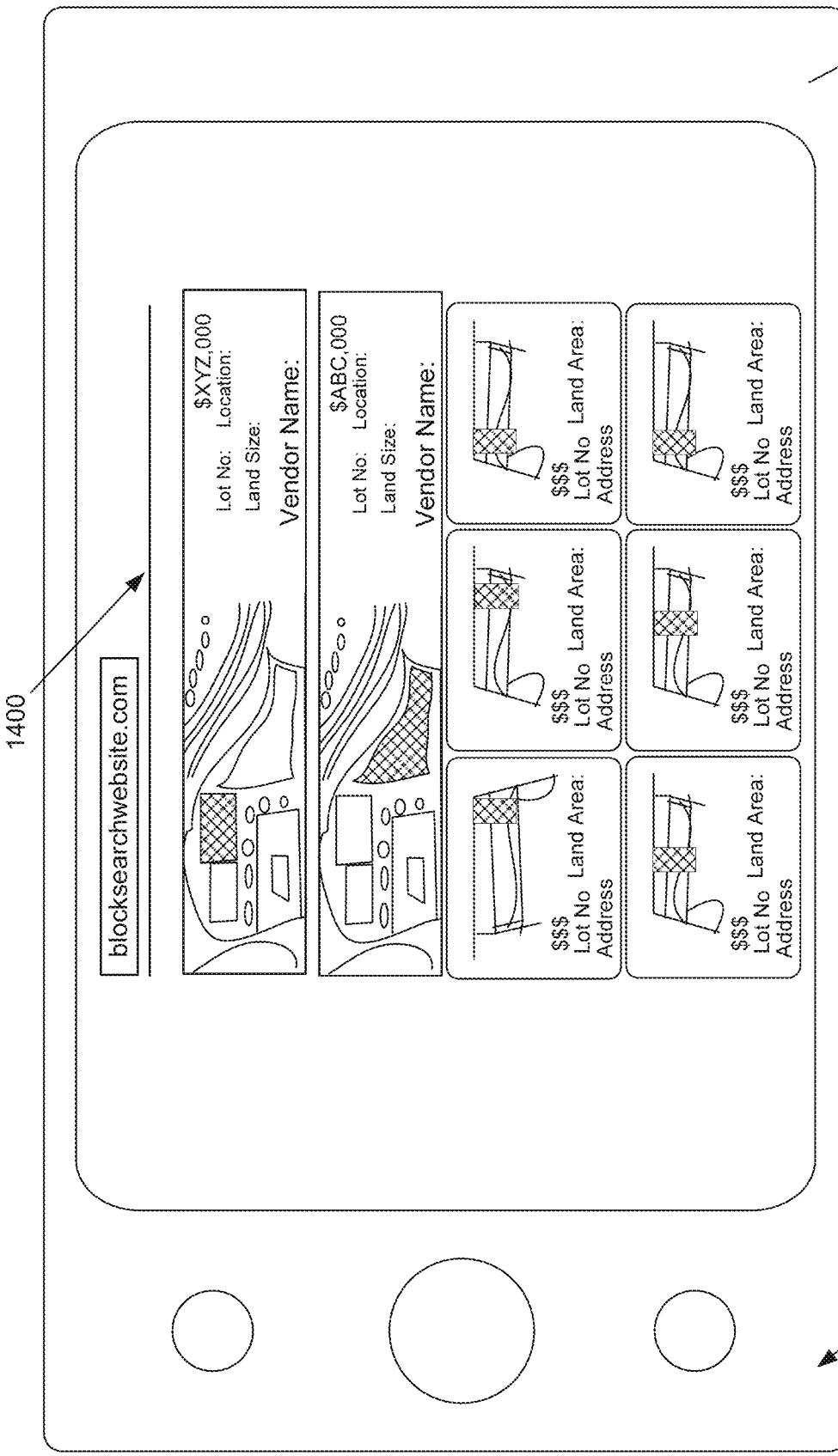
FIG. 14 is a view of a device of FIG. 1 displaying compatible blocks of land for a user nominated house floor plan under consideration by the user.
Figure 15:
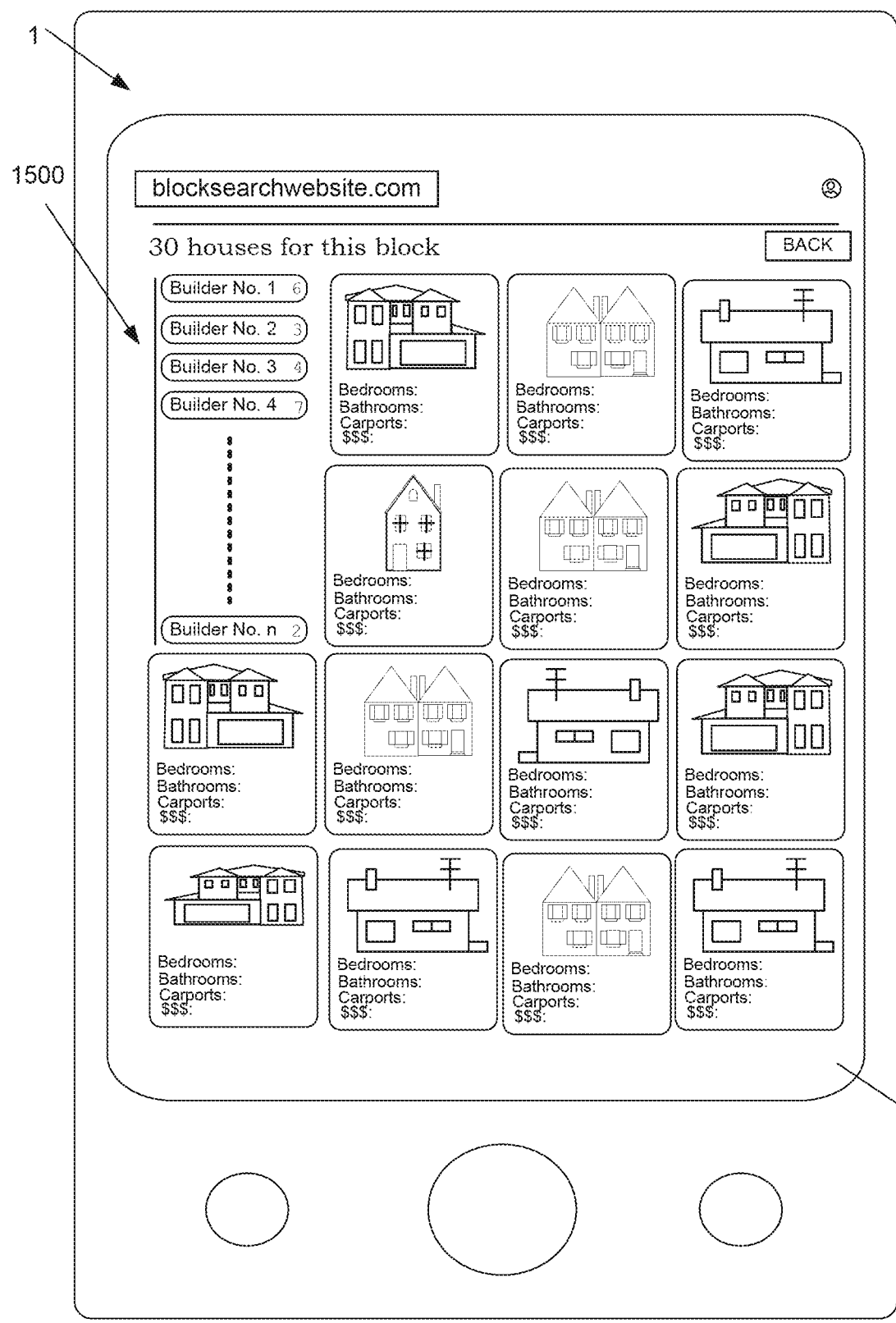
FIG. 15 is a view of a device of FIG. 1 displaying compatible house floor plans for a user nominated block of land under consideration by the user.

Once the user 100 has selected a block of land, e.g. from screen 1400 of FIG. 14, the user 100 will then be prompted to select from a list of compatible floor plans as shown in screen 1500 of FIG. 15.

Figure 16:
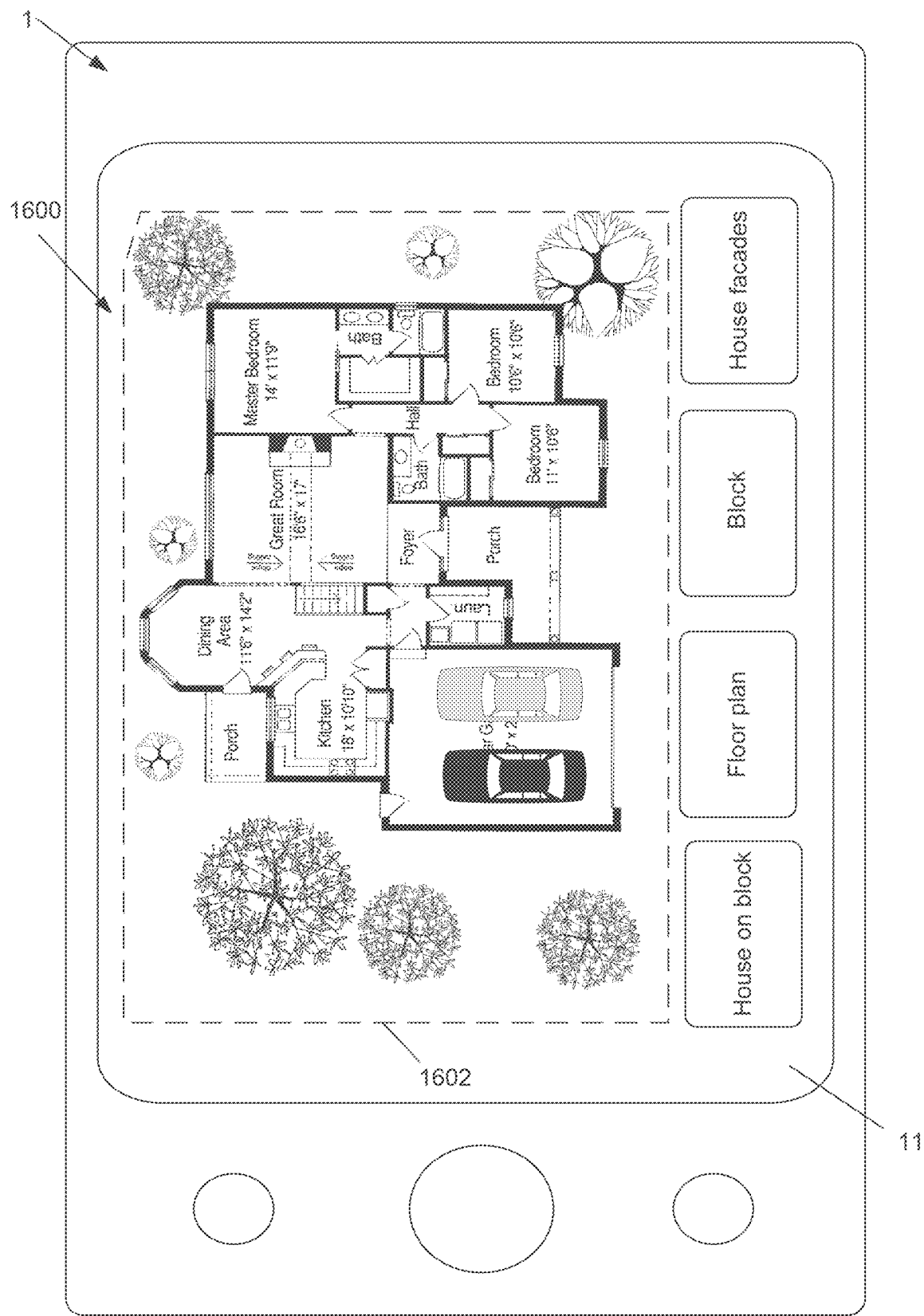
FIG. 16 is a view of a device of FIG. 1 displaying a house floor plan selected by the user juxtaposed with a compatible block of land.

Upon selection of a floor plan the server 33 serves a page in the browser of device 1 to display screen 1600 of FIG. 16, overlaying the floor plan onto the block of land.

The user 100 will have the ability to operate controls in screen 1600 to move and rotate the floor plan on the land, however such movements are limited regarding how close the floor plan can be moved to the edge of the block.

An additional list of the remaining compatible floor plans will be displayed below the rendered image such that the user can choose a different floor plan to display.

It will therefore be realised that embodiments of the present invention provide a method and system for the rapid matching of plans for blocks of land with compatible building floor plans and vice versa. Furthermore, the floor plan images can be automatically processed to identify the portion of the image that relates specifically to the floor plan and extraneous material removed. The specifications are then automatically extracted without need for user intervention.

Implementations of the present disclosure and all of the functional operations provided herein may be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, "App", script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

We claim:

1. A method for matching building floor plans with specifications for blocks of land wherein the building floor plans comprise image files; the method comprising:
   storing specifications for each of a plurality of blocks of land in an electronic database the specifications including lengths of block sides;
   electronically processing the image files of each of the building floor plans to thereby store specifications for each of said plans in said database the processing including:
      converting text in each plan into parseable text and identifying numerical values in the string to extract length and width values for external dimensions of the floor plan, and
      identifying one or more orientation critical words from the text string and its position on the plan; and
   querying the database to determine compatible matches between a selected one of the building floor plans and the blocks of land, or vice-versa, taking into account the specifications including the extracted length and width values and the orientation critical words.

2. The method according to claim 1, including maintaining a server in data communication with the database, the method including serving at least one page for acquiring the specifications for blocks of land to at least one remote client device over a data network for capturing specifications for a block of land from a user operating said remote client device.

3. The method according to claim 2, including serving a page including a graphical user interface for the user to draw a plan of the block of land into the remote client device.

4. The method according to claim 3, including operating the server to check each specification for a block of land that it receives prior to storing said specification in the database.

5. The method according to claim 2, including operating the server to request the uploading of image files for floor plans from users via the at least one remote devices.

6. The method according to claim 1, including pre-processing the floor plan image files to remove extraneous material from the image files.

7. The method according to claim 6, wherein the pre-processing includes removing drawing title blocks and/or rendered building images from the image files so that only the floor plans remain in the pre-processed image files.

8. The method according to claim 7, wherein removing extraneous material includes applying a blob detection procedure to identify major portions of the image file such as the floor plan component, the rendered image component, the drawing title block and any other image portion present in the image file.

9. The method according to claim 8, including removing blobs that do not include floor plan features.

10. The method according to claim 6, wherein the pre-processing includes applying a trained decision machine to detect the essential floor plan features.

11. The method according to claim 6 including applying optical character recognition (CR) to each floor plan image subsequent to pre-processing thereof, to convert text images in each said image into parseable characters wherein the position of the text images numbers in the floor plan are recorded in the database in association with adjacent width and length lines of the floor plan.

12. The method according to claim 11, including recording the position of orientation critical words in the floor plan in the database and using said positions to determine orientation requirements for the floor plan.

13. The method according to claim 1, wherein the querying of the database to determine compatible matches between a selected one of the building floor plans and the blocks of land, or vice-versa preferably includes either:
   searching the database for plans with smaller dimensions than a block of land under consideration; or
   searching the database for blocks of land with a larger dimension than a floor plan under consideration; and
   returning a list of results matching the item under consideration to the at least one remote device with a prompt for a user to select an item from the list of results.

14. The method according to claim 13, including upon the user making the selection of the item, operating the server to render the selected item relative to the item under consideration for review by the user.

15. The method according to claim 14, including operating the server to provide user controls for the user to move and rotate the item under consideration relative to the selected item so that that the user can ascertain a preferred position and orientation.

16. A computer server that is configured to serve data to portable computational devices in accordance with the method of claim 1.

* * * * *